United States Patent Office 3,672,799
Patented June 27, 1972

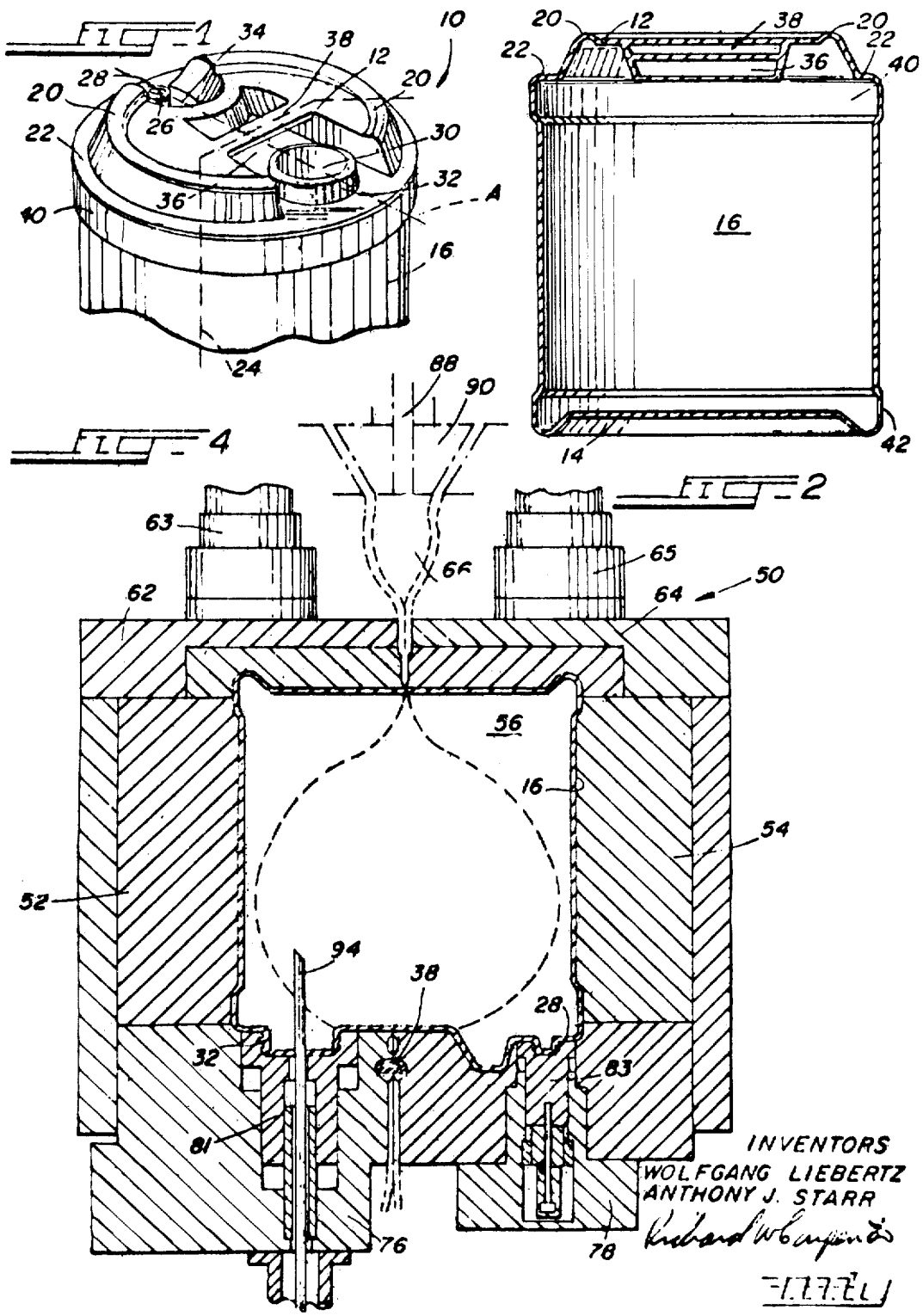

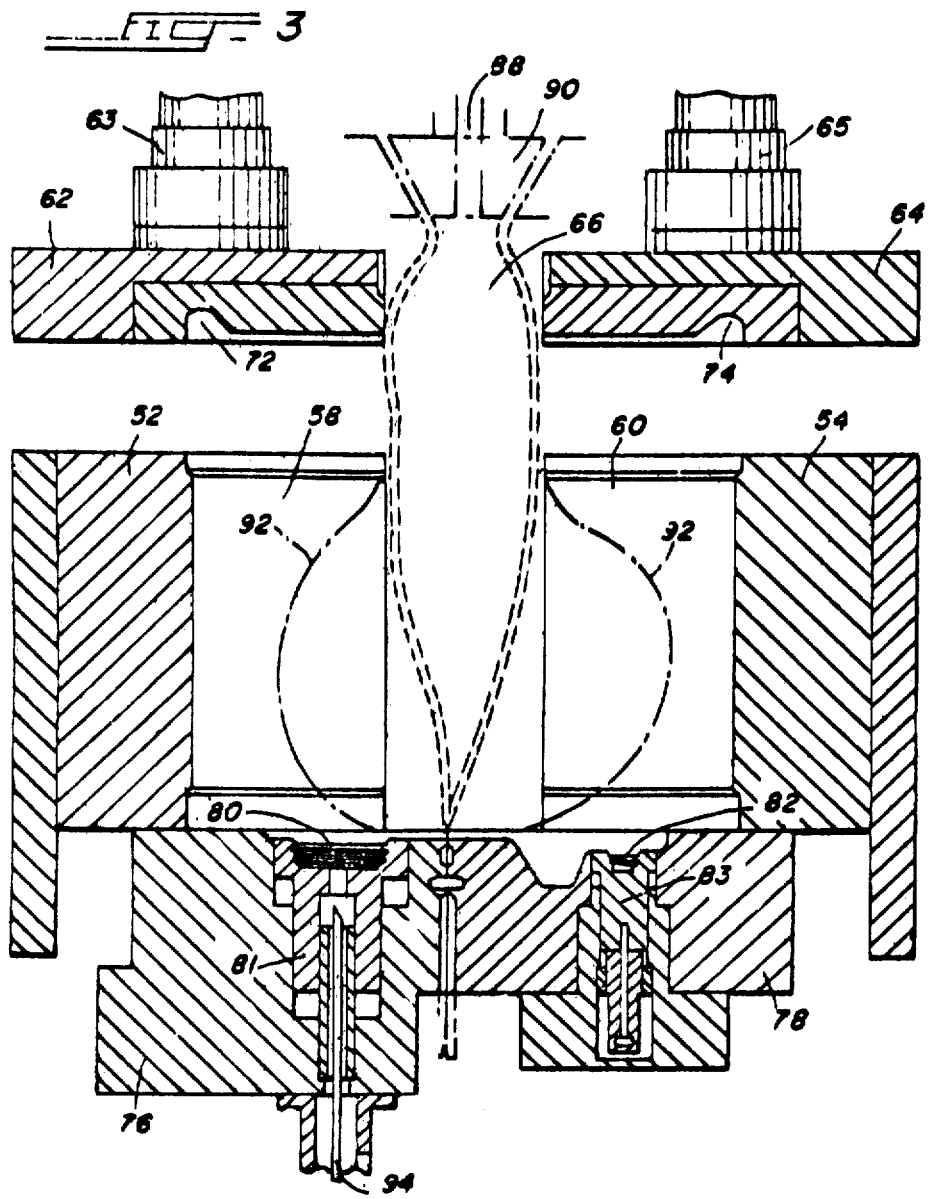

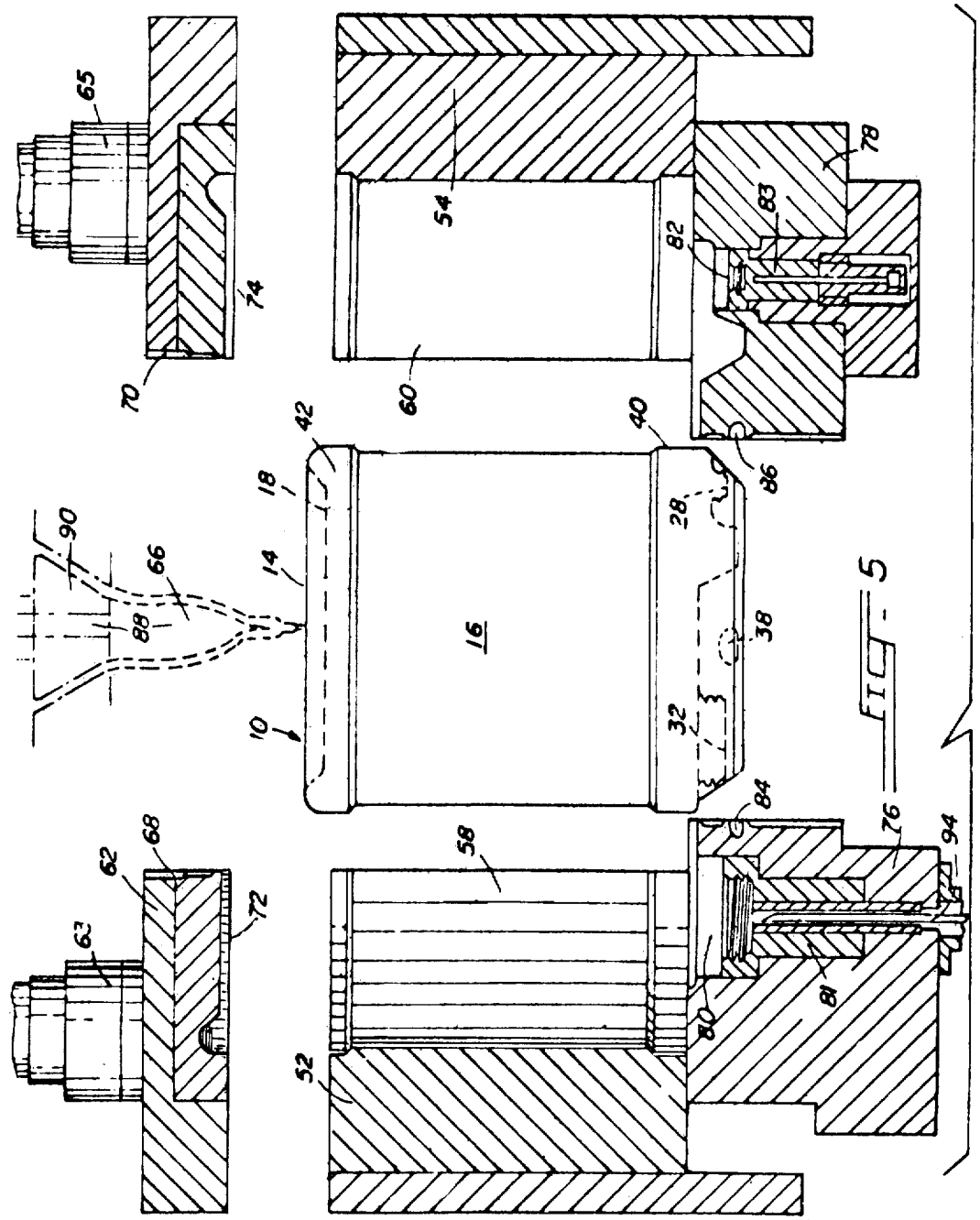

3,672,799
APPARATUS FOR FORMING A STACKABLE CONTAINER
Wolfgang Liebertz and Anthony J. Starr, Wilmington, Del., assignors to Container Corporation of America, Chicago, Ill.
Original application Sept. 18, 1968, Ser. No. 760,427. Divided and this application July 17, 1970, Ser. No. 55,740
Int. Cl. B29c 17/07; B29d 23/03
U.S. Cl. 425—330
2 Claims

ABSTRACT OF THE DISCLOSURE

A unitary, stackable container is formed from moldable material and has integral top and bottom members interconnected by a hollow, tubular body and further comprises a stacking indentation in the bottom member, a pair of ridges upstanding from the top member and being adapted to engage the stacking indentation in the bottom member of a similar container when the containers are stacked, the top member having a pair of threaded, flanged apertures located adjacent the opposite sides of the member, a handle integrally formed with the top member and having its long axis positioned in a normal relationship with the axis extending through said apertures. The method of forming the above container includes the steps of suspending a tube of plastic material having one closed end and one open end between a pair of separated mold halves, introducing air into the tube through the open end for partially expanding the tube, enclosing the partially expanded tube in a cavity of the mold by bringing the mold halves into mating registry, completing the expansion of the tube by introducing air into the tube at a location other than the open thereby causing the tube to assume the configuration of the cavity, maintaining said expanded tube under internal air pressure for a predetermined time, exhausting air from the expanded tube, and separating the mold halves for removal of the article formed. The apparatus for forming the container comprises a pair of mold halves movable relative to one another into mating registry, a pair of article bottom forming plates positioned above the mold halves and movable relative to one another and into contacting engagement with the mold halves, a pair of article top forming plates located below the mold halves and movable into mating registry with one another and having cavities for forming threaded, flanged apertures and a handle in the top member of the container.

This is a division of our co-pending patent application, Ser. No. 760,427, filed Sept. 18, 1968, now abandoned.

BACKGROUND OF THE INVENTION (1) Field of the invention

This invention relates to a container integrally formed from moldable material, and more particularly, to a container so formed and having a pair of apertures and a handle on the top member, the long axis of the handle being positioned normally to the axis extending through the apertures; the invention further relates to a method and apparatus for forming the above container.

(2) The prior art

It has been a practice to form molded plastic containers the top members or surfaces of which feature flanged apertures and handle components with the long axis of the handle paralleling the axis extending through the apertures or, when considered in view of the forming operation, the long axis of the handle being positioned across the parting line of the mold. The containers of this type present problems in use due to the location of the handle which necessitates awkward and inconvenient positioning of the user's hand when a loaded container is tipped to empty its contents. To improve handling of the container, the handle should be so located that its long axis be parallel to the mold parting line and normal to the axis extending through the apertures formed on the top surface of the container and positioned adjacent its opposite edges.

There has long existed a need in the industry for containers formed plastic, or the like, wherein the unique properties of the plastic materials can be well-utilized and which containers feature structural characteristics making them useful, functional and convenient for use as shipping containers. Among these features are apertures for filling and dispensing with means for securely closing them during storage and shipment; handle devices to assist in the movement and manipulation of the containers, and features enabling stacking of the containers in columnar interlocking relationship in storage or in shipment.

SUMMARY OF THE INVENTION

The present invention overcomes the disadvantages of the prior art and provides a one piece, integrally formed container molded of suitably strong material and having threaded, flanged apertures strategically located on the top of the container and an integrally formed handle having its long axis disposed normally to the axis extending through the apertures and paralleling the parting line of the mold. The container of the present invention further discloses a stacking indentation in the bottom thereof with one or more ridges formed on the top of the container which are to engage the stacking indentation in the bottom of a similar container when the containers are stacked.

The method of the present invention provides for formation of the container by blow molding where the plastic is first partially and later fully expanded to cause its conformation to the configuration of the mold cavity. The apparatus relates to a pair of movable mold halves and pairs of movable container top and bottom forming plates having cavities for formation of apertures, handle and other elements.

DRAWINGS

FIG. 1 is a perspective view of a portion of the container embodying the principles of the present invention;

FIG. 2 is a front elevational, sectional view of the container of the present invention;

FIG. 3 is an illustration of the start of formation of the container shown in FIG. 1 utilizing the method and apparatus of the present invention;

FIG. 4 illustrates the formation of the container of the present invention by utilizing the apparatus of the present invention; and FIG. 5 illustrates a formed container of the present invention with the apparatus opened to remove the container.

Referring now to the drawing, more specifically to FIGS. 1 and 2, there is shown a unitary, stackable container formed from moldable material and being generally designated 10. The container has integrally formed top and bottom members 12 and 14, respectively, interconnected by a hollow, tubular body 16. As best seen in FIG. 5, the bottom member 14 of the container is formed with a stacking indentation 18. The top member 12 has one or more ridges 20 integrally formed therewith and upstanding therefrom, the ridges being adapted to engage the stacking identation 18 in the bottom member of a similar container when the containers are stacked one on top of the other.

The bottom portions of the ridges 20 are spaced from the edges, or sides, of the top member by a shoulder 22.

Since, as later described, the container is formed by bringing two mold halves into a mating relationship with one another, the container has a mold parting line 24. A pair of apertures are formed on the top member of the container and on the opposite sides of the mold parting line 24. A vent aperture 26 has a threaded upstanding flanges 28 while a filling or discharge aperture 30 has a threaded, upstanding flange 32. A small recess 34 surrounds the vent aperture 26 while an elongated, hand-receiving, recess 36 is formed adjacent the filling aperture 30 and extends inwardly therefrom.

A handle 38 is integrally formed with the container in such a manner that it overlies the recess 36. As it is readily apparent from FIG. 1, the long axis of the handle 38 is positioned along and parallel to the mold parting line 24 and normally to the axis A extending through the centers of the flanged apertures 26 and 30.

Positioning of the handle 38 in the manner illustrated in FIG. 1, allows the user to conveniently tilt the container and thereby dispense its contents with the minimum of inconvenience and effort. As stated heretofore, the containers known in the art, have had the handles positioned in such a way that their long axes were located across the mold parting lines, such as line 24 shown in FIG. 1. It can be seen that manipulation of such a container, especially as it affects removal of its contents, would be awkward and quite inconvenient to the user.

As best seen in FIG. 2, the body 16 may be indented between top and bottom flanges 40 and 42, respectively, to protect a label, or the like, which may be affixed on the exterior of the body 16.

Referring now to the apparatus of the present invention, FIGS. 4 through 6 illustrate the mold, generally designated 50. For best description of the individual components of the mold, a reference is being made to FIG. 5 where the mold is shown in an open position.

The mold comprises a pair of mold halves 52 and 54 which are movable relative to one another, as shown in FIG. 3, to come into a mating registry, as shown in FIG. 4, thereby defining a mold cavity 56 therebetween. The mold cavity 56 is formed of sections 58 and 60 of the mold halves 52 and 54, respectively. The interior surfaces of sections 28 and 60 are made to correspond to the exterior surfaces of the body 16 of the container including portions of flanges 40 and 42. Positioned above the mold halves 52 and 54 there is a pair of article bottom forming plates 62 and 64 attached to supports 63 and 65, respectively. The plates are movable relative to one another to receive therebetween a tube 66 of plastic material when the plates 62 and 64 are brought in registry with one another. The mating edges of the plates 62 and 64 are formed with recesses 68 and 70, respectively, for receiving the tube 66 when the plates are closed. Both plates 62 and 64 are also movable vertically to come into contacting engagement with mold halves 52 and 54, respectively, to form the bottom member 14 of the container 10 with the stacking indentation 18. Indentation 72 and 74 on the bottom portions of plates 62 and 64 represent portions of necessary cavities for formation of the bottom member 14.

Positioned below the mold halves 52 and 54 and attached thereto, there is a pair of article top forming plates 76 and 78, respectively. These plates are also movable relative to one another to provide mating registry therebetween for formation of the necessary elements on the top member of the container 10. The plate 76 has an elongated cavity 80 used to form the threaded, flanged aperture 30 while the plate 78 has a similar elongated cavity 82 for forming the threaded, flanged vent aperture 26. The cavities 80 and 82 have movable closure inserts 81 and 83, respectively, positioned therewithin.

The mating edges of both plates 76 and 78 are formed with recesses 84 and 86, respectively, for formation of the handle 38 when the plates are in registry as a result of registry between mold halves 52 and 54.

In the formation of the container 10, as best seen in FIG. 3, a tube 66 of plastic material, or parison, is suspended from an extruder (not shown) and located between the mold halves 52 and 54. The open end of the parison 66 is provided with an air inlet tube 88 having a collar 90 which restricts the open end of the parison. The air is brought in through inlet 88 and, as the mold halves and plates begin to close, the parison 66 is partially blown into a shape designated 92. When the mold 50 is closed, a second air inlet conduit 94 is introduced through the aperture forming cavity 80 into the main mold cavity 56 and, as best seen in FIG. 4, pierces the pre-blown configuration 92 and supplies additional air in order to expand the tube, or parison 66, to the final configuration which conforms to the shape of the cavity 56. The air is supplied through the inlet 94 for a predetermined time until a container is substantially formed in the heated mold cavity. When the container is formed, the mold halves and the respective plates are separated again, as best seen in FIG. 5, and the container remains attached to the pinched-off end of parison 66 from where it can be removed for further processing. As the mold opens, closure inserts 81 and 83 are screwed out in a downward direction and away from contact with the newly formed flanged apertures 26 and 30, respectively.

We claim:

1. An apparatus for forming an article having a pair of threaded, flanged apertures on the top member thereof, comprising:
    (a) a pair of mold halves movable relative to one another into mating registry with each other to define a mold cavity therebetween;
    (b) a pair of article bottom forming plates positioned above said mold halves and movable relative to one another and into contacting engagement with said mold halves and having recesses for receiving a tube of plastic material therebetween;
    (c) a pair of article top forming plates positioned below said mold halves and movable relative to one another into mating registry with each other when said mold halves are being moved into registry, each of said top forming plates having:
        (i) a cavity for forming a threaded, flanged aperture;
        (ii) a recess on the interior edge of the plate for forming a handle when said plates are in mating registry.

2. An apparatus as defined in claim 1, wherein each of said cavities for forming threaded, flanged apertures have movable closure inserts.

References Cited
UNITED STATES PATENTS

| | | | |
|---|---|---|---|
| 3,342,916 | 9/1967 | Peters | 18—5 BZ X |
| 3,398,427 | 8/1968 | John | 18—5 BZ |
| 3,399,424 | 9/1968 | Sheplek | 18—5 BZ |
| 3,538,543 | 11/1970 | Natof | 18—5 BZ |

ROBERT L. SPICER, Jr., Primary Examiner

U.S. Cl. X.R.

264—94; 425—327